(12) United States Patent
Melanson

(10) Patent No.: US 9,077,262 B2
(45) Date of Patent: Jul. 7, 2015

(54) CASCADED SWITCHING POWER CONVERTER FOR COUPLING A PHOTOVOLTAIC ENERGY SOURCE TO POWER MAINS

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1007 days.

(21) Appl. No.: 12/933,990

(22) PCT Filed: Apr. 28, 2009

(86) PCT No.: PCT/US2009/041910
§ 371 (c)(1),
(2), (4) Date: Sep. 22, 2010

(87) PCT Pub. No.: WO2009/134756
PCT Pub. Date: Nov. 5, 2009

(65) Prior Publication Data
US 2011/0032734 A1    Feb. 10, 2011

Related U.S. Application Data

(60) Provisional application No. 61/048,805, filed on Apr. 29, 2008.

(51) Int. Cl.
*H02M 5/45* (2006.01)
*H02M 7/5383* (2007.01)
(Continued)

(52) U.S. Cl.
CPC ............ *H02M 7/53832* (2013.01); *H02M 1/14* (2013.01); *H02M 7/4807* (2013.01); *Y02E 10/563* (2013.01); *H02J 3/383* (2013.01)

(58) Field of Classification Search
CPC ......... H02M 1/14; H02M 5/45; H02M 5/451; H02M 5/458; H02M 7/53832; H02M 7/4807
USPC .................. 315/291, 294, 293; 333/99, 17.2; 323/266, 268, 271, 282, 285, 286; 363/37, 17, 40, 41, 55, 56.02, 95, 96, 363/98, 131, 132, 97, 89
See application file for complete search history.

(56) References Cited

U.S. PATENT DOCUMENTS 3,913,002 A * 10/1975 Steigerwald et al. ............ 363/18
4,750,102 A *  6/1988 Yamano et al. ................. 363/142
(Continued)

FOREIGN PATENT DOCUMENTS

EP         1235339 A2    8/2002
WO    WO2004008619 A2   1/2004

OTHER PUBLICATIONS

Johnson, Brian, "Power Conditioning in Photovoltaic Systems", Texas State University, 2007, Austin, TX.
(Continued)

*Primary Examiner* — Adolf Berhane
*Assistant Examiner* — Nusrat Quddus
(74) *Attorney, Agent, or Firm* — Mitch Harris, Atty at Law, LLC; Andrew M. Harris

(57) ABSTRACT

A cascaded switching power converter for coupling a photovoltaic (PV) energy source to power mains provides a high-efficiency and a potentially simple control mechanism for AC solar energy conversion systems. The PV energy source charges a capacitive storage element through a DC-DC converter, and an inverter couples energy from the capacitive storage element to the mains supply. The DC-DC converter is controlled so that ripple present on the capacitive storage element due to current drawn by the inverter is not reflected at the input of the DC-DC converter, which is accomplished by varying the conversion ratio of the DC-DC converter with the ripple voltage present across the capacitor. The average voltage of the capacitor can also be increased with increases in the available power output from the PV energy source, so that a corresponding increase in power is transferred to the mains supply.

29 Claims, 11 Drawing Sheets

(51) Int. Cl.
*H02M 1/14* (2006.01)
*H02M 7/48* (2007.01)
*H02J 3/38* (2006.01)
*H02M 5/451* (2006.01)
*H02M 5/458* (2006.01)

(56) References Cited

U.S. PATENT DOCUMENTS

| | | | | |
|---|---|---|---|---|
| 4,885,675 | A | * | 12/1989 | Henze et al. ............... 363/26 |
| 5,286,360 | A | * | 2/1994 | Szczyrbowski et al. . 204/298.08 |
| 5,381,327 | A | * | 1/1995 | Yan ............................ 363/24 |
| 5,645,698 | A | * | 7/1997 | Okano ..................... 204/192.12 |
| 5,882,492 | A | * | 3/1999 | Manley et al. .......... 204/298.08 |
| 5,889,391 | A | * | 3/1999 | Coleman ................... 323/271 |
| 5,907,223 | A | * | 5/1999 | Gu et al. .................... 315/247 |
| 6,001,224 | A | * | 12/1999 | Drummond et al. ..... 204/192.12 |
| 6,023,037 | A | * | 2/2000 | Church et al. ........... 219/121.39 |
| 6,281,485 | B1 | | 8/2001 | Siri |
| 2004/0027112 | A1 | * | 2/2004 | Kondo et al. ............... 323/355 |
| 2004/0085788 | A1 | * | 5/2004 | Weng ........................ 363/126 |
| 2005/0111246 | A1 | * | 5/2005 | Lai et al. .................... 363/157 |
| 2005/0180175 | A1 | * | 8/2005 | Torrey et al. ................ 363/17 |
| 2006/0220938 | A1 | * | 10/2006 | Leung et al. ............... 341/155 |
| 2007/0047275 | A1 | * | 3/2007 | Hesterman et al. ........... 363/95 |
| 2007/0159866 | A1 | * | 7/2007 | Siri ............................. 363/95 |
| 2007/0290668 | A1 | | 12/2007 | Chou |
| 2010/0097827 | A1 | * | 4/2010 | Ben-Yaakov ................ 363/65 |

OTHER PUBLICATIONS

El-Tamely., H.H., "Computer Simulation of Photovoltaic Power System Interconnected with Utility Grid", Al-Azhar University Engineering Journal, vol. 8, No. 7, Jan. 2005, Egypt.

* cited by examiner

CASCADED SWITCHING POWER CONVERTER FOR COUPLING A PHOTOVOLTAIC ENERGY SOURCE TO POWER MAINS

The present Application is a National Stage Application filed under 35 U.S.C. §371 of PCT Application US09/2009/041910 filed on Apr. 28, 2009 by the same inventor, and which claims priority to U.S. Provisional Patent Application 61/048,805 filed on Apr. 29, 2008.

FIELD OF THE INVENTION

The present invention relates generally to switching power inverter circuits, and more specifically, to a cascaded switching power converter for coupling a photovoltaic energy source to power mains.

BACKGROUND OF THE INVENTION

Photovoltaic (PV) solar energy production has been of interest for several decades, and with consistent decreases in the cost of solar arrays, along with a growing cost of non-solar energy, the penetration of PV energy sources is expected to continue to rise. Interest in PV and other systems in reducing greenhouse gas emissions and improving air quality can also be expected to raise the demand for PV energy sources.

In order to use PV energy sources in conjunction with existing power grids ("mains" supplies), it is necessary to convert the DC output of the PV source to AC current at the mains frequency and power. This conversion is typically accomplished by an inverter circuit that converts the output of the PV array to the necessary single phase or multi-phase AC current(s). It is desirable to operate the PV energy source at a load (output) current level determined from a maximum power point (MPP) of the PV source, which varies with the amount of available sunlight. Operating at the MPP provides the most efficient use of the PV energy source, as long as all of the energy can be transferred to the mains supply. The voltage of the PV source varies with the load current level, but the MPP voltage is substantially constant, while the MPP current level changes with the available sunlight. The inverter may directly convert the DC output of a PV array to, for example, a $230V_{RMS}$ two-phase power main at 60 Hz for the United States for utility customer owned PV applications, or a three-phase power main at 60 Hz and a suitable voltage for operating a transformer to step-up the inverter output to a distribution system voltage such as $4160V_{RMS}$.

More efficient inverters have been implemented that use a cascaded configuration to convert the output of the PV energy source to a high-voltage DC source, such as 360V, using a DC-DC converter, and then generate the AC mains supply output using an AC inverter that operates from the 360V DC power supply generated by the DC-DC converter. However, such inverters require large capacitors for the high-voltage DC source in order to prevent ripple due to the varying current at the input of the AC inverter, which would otherwise be present on the output of the DC-DC converter. If the ripple is not filtered, the variation in voltage at the output of the DC-DC converter causes large variations in the load current drawn from the PV energy source, which represent deviation from the MPP and therefore a drop in system efficiency.

Large electrolytic capacitors are undesirable both from a cost and volume standpoint, but in PV array applications, they are also undesirable for their impact on the reliability of the system. With system life-spans exceeding 30 years and with operational requirements at high temperatures, the use of electrolytic capacitors has a large impact on the mean-time-between-failure (MTBF) of the power converter, and thus a PV system as a whole.

Therefore, it would be desirable to provide a power converter for coupling a PV energy source to a mains supply while maintaining PV energy source operation substantially at the MPP and reducing variation in the PV energy source loading without requiring large unreliable electrolytic capacitors.

DISCLOSURE OF THE INVENTION

The above stated objective of providing a power converter for coupling a PV energy source to a mains supply while maintaining operation of the PV source near the MPP, is accomplished in a cascaded switching power converter, its methods of operation and integrated circuits (ICs) embodying at least a portion of the control electronics for operating the converter.

The converter includes a DC-DC converter that charges a link capacitor and an inverter that transfers power from the link capacitor to the mains supply. The DC-DC converter is controlled so that voltage ripple due to the AC current drawn by the inverter from the link capacitor does not affect the conditions at the input of the DC-DC converter. Therefore, the operating point of the PV source is maintained at a constant voltage/current operating point, generally at the MPP. The inverter and DC-DC converter can be controlled solely from the voltage across the link capacitor, and an integrated circuit providing such control provides an embodiment of the invention. The average voltage across the link capacitor can be controlled such that the energy stored in the link capacitor increases as the available power from the PV source rises, so that in response, the inverter will generate a larger current output onto the mains supply.

The foregoing and other objectives, features, and advantages of the invention will be apparent from the following, more particular, description of the preferred embodiment of the invention, as illustrated in the accompanying drawings.

BEST MODE FOR CARRYING OUT THE INVENTION

The present invention encompasses photovoltaic (PV) power converters, for coupling a PV power source to AC mains power lines. Energy is transferred to a link capacitor by a DC-DC converter, which provides the input source for an inverter that is synchronized to the AC mains. The control of the DC-DC converter is such that a low input impedance and a relatively high output impedance is maintained, so that as the AC input current of the inverter causes ripple on the link capacitor, the DC operating point of the PV power source is unaffected, and is maintained at a maximum power point (MPP) by action of the DC-DC converter control loop. The RMS value of the output current of the inverter is determined from the voltage across the link capacitor, which rises as the available current from the PV power source increases. The instantaneous output current of the inverter is controlled to be proportionate to and in-phase with the instantaneous mains voltage. The resulting system operation maintains the PV power source at its MPP by ensuring an energy flow out of the inverter that is equal to the maximum energy obtainable from the PV power source, less any losses in the converter circuits.

Figure 1:
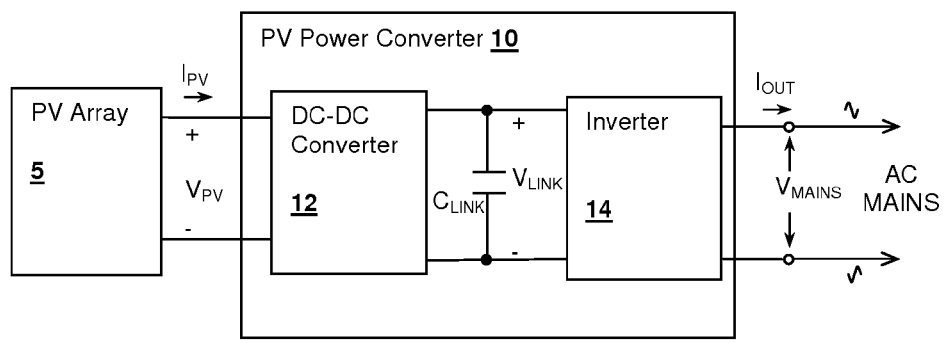
FIG. 1 is a block diagram depicting a photovoltaic (PV) power system in accordance with an embodiment of the present invention.

Referring now to FIG. 1, a PV power system in accordance with an embodiment of the present invention is shown. A PV array 5 has an output voltage $V_{PV}$ and an output current $I_{PV}$ that are introduced at input terminals of a PV power converter 10, and specifically at input terminals of a DC-DC converter 12 within PV power converter 10. DC-DC converter 12 charges a link capacitor $C_{LINK}$ in order to store energy on capacitor $C_{LINK}$ that was obtained from PV array 5, and that will be removed by an inverter 14 to supply AC current to AC power mains AC MAINS. AC power mains AC MAINS have a voltage $V_{MAINS}$ and can generally be considered a very low-impedance sink in that voltage $V_{MAINS}$ is generally substantially unaffected by the magnitude of an inverter output current $I_{OUT}$, which is generated by inverter 14 in phase with voltage $V_{MAINS}$. The control loop of inverter 14 causes inverter 14 to behave as a negative resistance in that power is transferred from inverter 14 to AC power mains AC MAINS. As voltage $V_{MAINS}$ decreases, inverter output current $I_{OUT}$ will increase, providing a constant output impedance from inverter 14 that maintains energy balance between the input and output of PV power converter 10 while PV array 5 is operated at its MPP.

Figure 2:
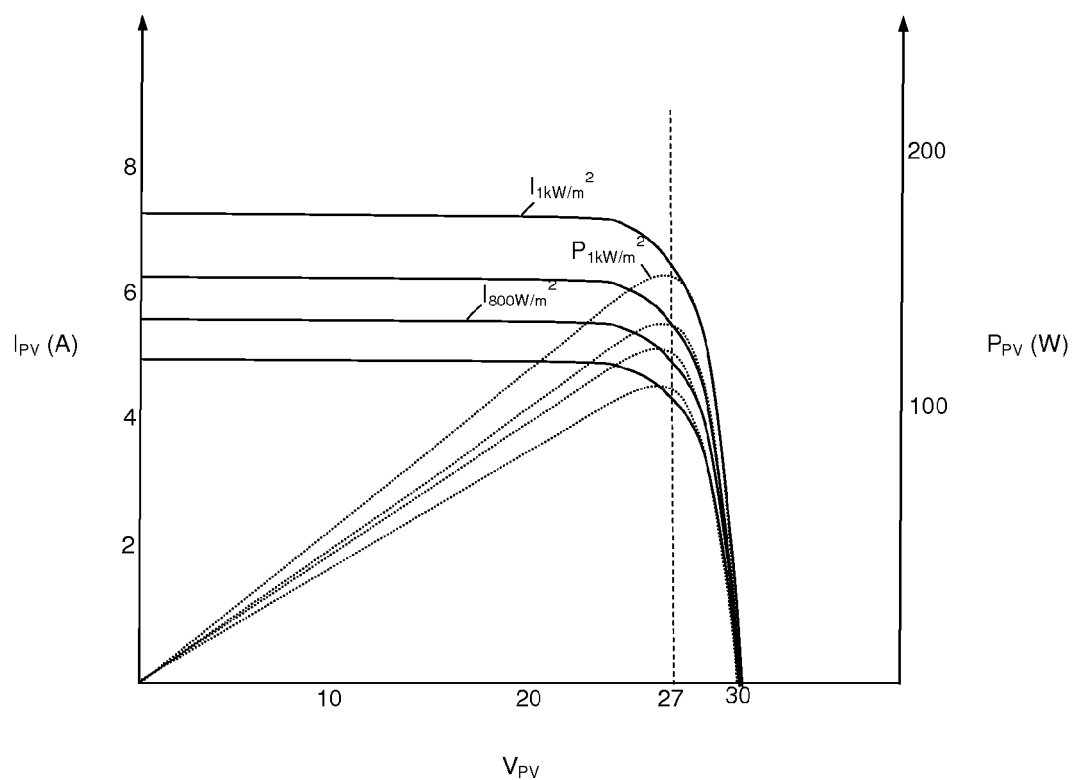
FIG. 2 is a graph depicting electrical output characteristics of a PV array as may be included within the system of FIG. 1.

Referring now to FIG. 2, electrical output characteristics of an exemplary PV array that may be used to implement PV array 5 in the system of FIG. 1 are shown. Both the PV array current $I_{PV}$ and output power $P_{PV}$ are shown as a function of the terminal voltage $V_{PV}$ at the output of the PV array are illustrated for different incident light intensities (600 W/m²-1 kW/m² in increments of 100 W/m²). Each of the output power $P_{PV}$ curves peaks at a substantially constant voltage, in the depicted example, 27V. Therefore, by maintaining terminal voltage $V_{PV}$ at 27V, which is done by controlling PV array current $I_{PV}$, the output of the PV array can be maintained at the maximum power point (MPP) of the PV array, which is the peak of the particular output power $P_{PV}$ curve corresponding to the incident light intensity received by the array. FIG. 2 illustrates several principles. First, the MPP is not fixed but varies with incident light intensity and therefore the MPP must be dynamically tracked in order to always draw the maximum power level from the PV array. Second, the MPP condition can be maintained by keeping the output voltage of the PV array at a substantially constant terminal voltage. Finally, the MPP condition can be maintained by controlling the output current of the PV array to attain that substantially constant terminal voltage irrespective of the amount of current produced at the MPP.

In the system of FIG. 1, there are several alternative mechanisms that may be employed to maintain PV array 5 at the MPP. One embodiment provides a mechanism that directly controls DC-DC converter 12 with an error loop that directly sets the PV terminal voltage $V_{PV}$ to a voltage corresponding to the MPP. However, an alternative embodiment that simplifies the control requirements for PV power converter 10 controls the DC-DC converter 12 to maintain the average voltage across link capacitor $C_{LINK}$ at a target voltage $V_{TARGET}$, which is varied with the changes of the MPP of PV array 5, so that more energy is stored in link capacitor $C_{LINK}$ when more power is available from, and therefore being drawn from, PV array 5.

Figure 3:
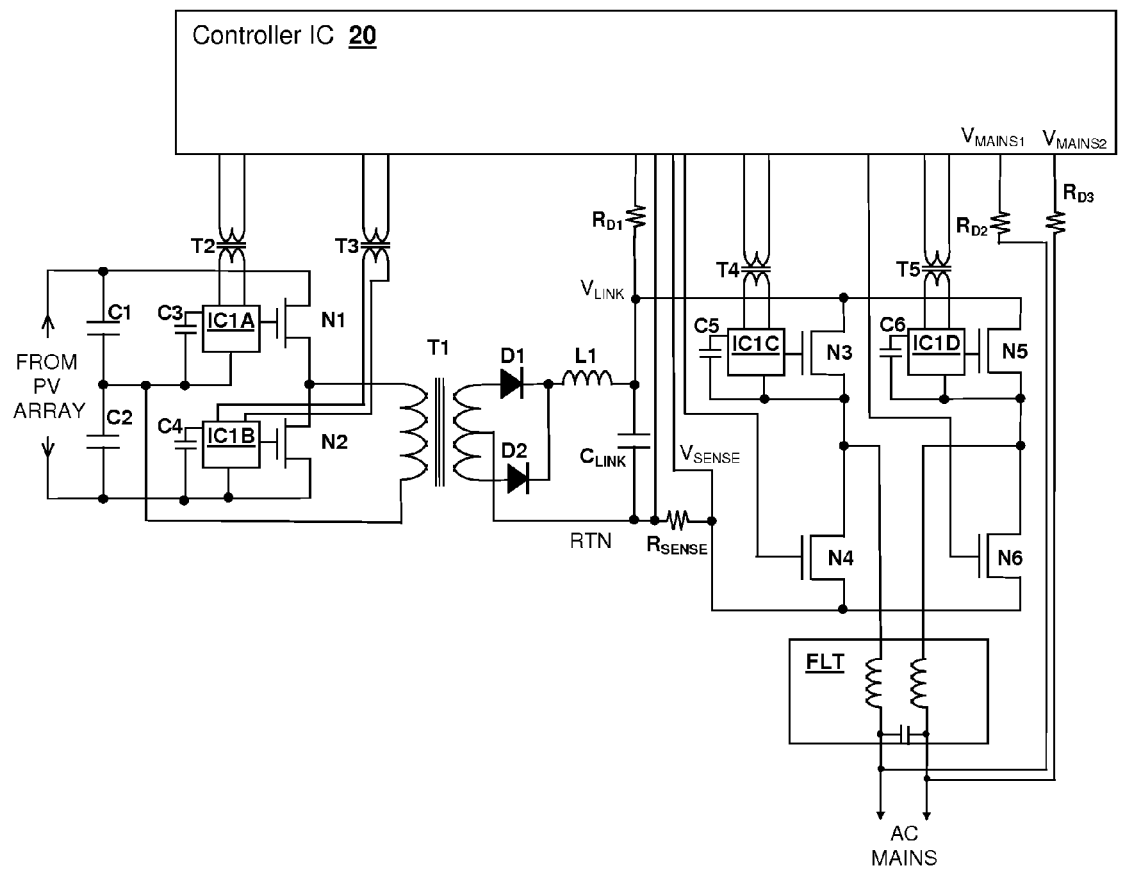
FIG. 3 is a simplified schematic diagram depicting a photovoltaic (PV) power system in accordance with an embodiment of the present invention.

Referring now to FIG. 3, a simplified schematic of a power converter that can be used to implement power converter 10 of FIG. 1 is shown. A single controller IC 20 is referenced to link voltage $V_{LINK}$ across link capacitor $C_{LINK}$, with return voltage point RTN. A dropping resistor $R_{D1}$ series-couples link voltage $V_{LINK}$ to controller IC 20, since link voltage $V_{LINK}$ is generally a high voltage. The control mechanism provided by controller IC 20 corresponds to the embodiment mentioned above in which the operation of a DC-DC converter is controlled by maintaining the average voltage across link capacitor $C_{LINK}$ at a target voltage $V_{TARGET}$. A DC-DC converter is formed by switching transistors N1 and N2, transformer T1, diodes D1-D2 and an output filter formed by inductor L1 and link capacitor $C_{LINK}$. The gates of switching transistors N1 and N2 are controlled by isolated gate driver integrated circuits IC1A and IC1B, respectively. The DC-DC converter receives the output of a PV power source such as the above-described PV array, and a pair of input capacitors C1 and C2 provide filtering at the switching frequency of the DC-DC converter. Therefore capacitors C1 and C2 can be quite small for high switching frequencies.

Isolated gate driver integrated circuits IC1A and IC1B may be provided by circuits such as those described in the section below entitled Transformer-Coupled Gate Control. Isolated gate driver integrated circuits IC1A and IC1B include circuits for receiving control information from the output of transformers T2 or T3, respectively, and generating a power supply voltage sufficient to drive the gate of their respective switching transistor N1 or N2, which is stored on power supply capacitors C3 and C4. Transformers T2 and T3 receive modulated signals from controller IC 20 to control at least the turn-on time and the turn-off time of transistors N1 and N2, respectively. Use of isolated gate driver integrated circuits IC1A and IC1B along with their respective transformers T2 and T3 and a DC-DC converter that includes an isolation transformer T1 provides galvanic isolation between the PV power source coupled to the input of the DC-DC converter.

Link capacitor $C_{LINK}$ provides the primary energy storage for the converter system and is coupled to the input of an inverter circuit formed by a full-bridge switching circuit including transistors N3-N6. Transistors N4 and N6 are controlled directly by signals provided from gate drivers within controller IC 20. Transistors N3 and N5 are controlled by isolated gate control ICs IC1C and IC1D, which have associated power supply capacitors C5 and C6, respectively. Isolated gate control ICs IC1C and IC1D receive modulated signals from controller IC 20 via transformers T4 and T5, respectively, and can be identical in structure to IC1A and IC1B as described above. The output of the inverter switching network formed by transistors N3-N6 is filtered by a filter FLT, which has an output coupled to AC power mains AC MAINS. The output current of the inverter is determined by controller IC 20 by measuring a voltage drop across a resistor $R_{SENSE}$ that is included in the return path of switching transistors N4 and N6. The voltage across the output of the inverter, as provided in the depicted embodiment from the output of filter FLT is provided to controller IC through dropping resistors $R_{D2}$ and $R_{D3}$ in order to determine the proper switching phase for switching transistors N3-N6. Voltages $V_{MAINS1}$ and $V_{MAINS2}$ are attenuated far below the amplitude of the voltage across AC power mains AC MAINS by dropping resistors $R_{D2}$ and $R_{D3}$, and provide an analog to indicate the phase and voltage of AC power mains voltage $V_{MAINS}$. The inverter is controlled so that the output current is sufficient to transfer all of the energy transferred into link capacitor $C_{LINK}$ by the DC-DC converter (the energy in excess of the energy required to charge the link capacitor $C_{LINK}$ to the desired target link voltage $V_{TARGET}$) into AC power mains AC MAINS at the mains voltage.

Figure 4:
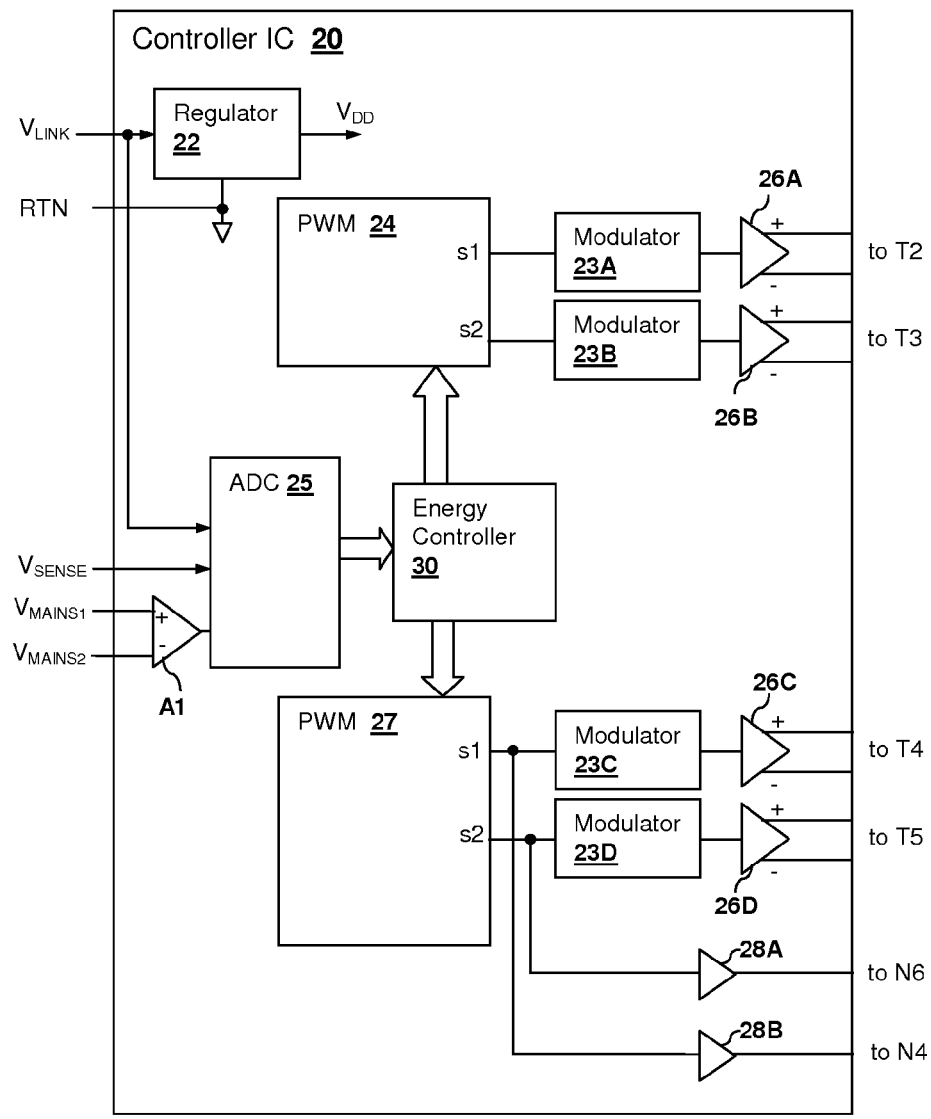
FIG. 4 is a block diagram depicting details of controller IC 20 of FIG. 3.

Referring now to FIG. 4, details of controller IC 20 are shown. A regulator 22 receives link voltage $V_{LINK}$ and provides internal power supply voltage $V_{DD}$ for operating internal circuits of controller IC 20. Link voltage $V_{LINK}$ is also provided to an analog-to-digital converter (ADC) 25, which also receives voltage $V_{SENSE}$ at another multiplexed/multichannel input. ADC 25 also receives an indication of the difference between voltages $V_{MAINS1}$ and $V_{MAINS2}$ from a difference amplifier A1. An energy controller 30, which may be a processor executing program instructions retrieved from a non-volatile memory, dedicated digital logic, or another suitable control mechanism, receives the output of ADC 25, and controls two PWMs: DC-DC converter control PWM 24 and inverter control PWM 27. The output of PWM 24 is provided to modulators 23A-23B, which are coupled to external transformers T2 and T3 by drivers 26A-26B. Similarly, the output of PWM 27 is provided to modulators 23C-23D, which are coupled to external transformers T4 and T5 by drivers 26C-26D. Direct outputs provided to the gates of transistor N4 and transistor N6 are coupled from PWM 27 by gate drivers 28A and 28B.

Figure 5:
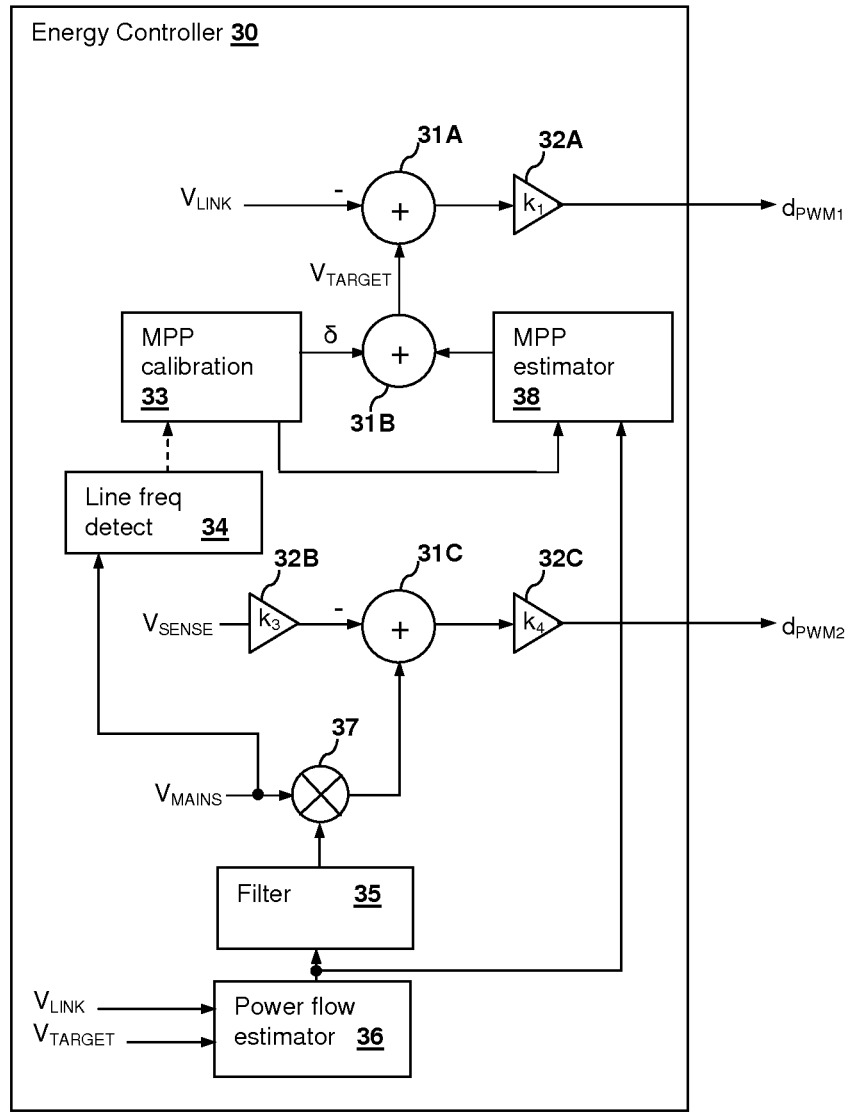
FIG. 5 is a block diagram depicting details of energy controller 30 of FIG. 4.

Referring now to FIG. 5, details of energy controller 30 are shown, which illustrate a logical flow of information, which is either representative of computation performed by program instructions or an action of dedicated logic. The value of voltage $V_{LINK}$ is subtracted from a target link voltage $V_{TARGET}$, which represents the target voltage for the voltage across capacitor $C_{LINK}$. The difference between target link voltage $V_{TARGET}$ and link voltage $V_{LINK}$ is scaled by factor k1 by scaling block 32A and provides a control variable $d_{PWM1}$ which is generally the duty cycle of DC-DC control PWM 24, but may, depending on the design of the DC-DC converter, be a control variable determinative of the switching frequency alone, or the duty cycle and switching frequency. The value of target link voltage $V_{TARGET}$ is set by an MPP estimator 38 that estimates the optimum value of target link voltage $V_{TARGET}$ for the current MPP of the PV power source. The estimation is based on periodic perturbations 6 introduced by summing block 31B, which may be triggered by a line frequency detection block 34, so that a perturbation is changed at each cycle of the AC power mains voltage $V_{MAINS}$, at another interval, or in response to an external command. In embodiments which regulate the PV array output voltage directly, such as that illustrated below in FIG. 7, the error loop can be perturbed directly to determine if the PV voltage reference level is appropriate for the present MPP. A change in power flow resulting from the perturbation is calculated by a power flow estimator 36, the operation of which is described in further detail below. The power flow change is used to update the value of target link voltage $V_{TARGET}$ according to the value computed by MPP estimator 38. The perturbations can be of short duration, e.g., the loop settling time of the DC-DC converter, which is generally shorter than the response time of the inverter, so that the operation of the system is not significantly disrupted. Alternatively, or in combination, the perturbations may be of very small amplitude and may therefore be applied continuously in some applications. In another embodiment, the target link voltage $V_{TARGET}$ can be varied at the line frequency, which is also generally above the response frequency range of the inverter control loop.

A control variable $d_{PWM2}$ which is generally the duty cycle, switching frequency or combination of controls for inverter control PWM 27, is provided by a similar circuit that includes scaling block 32C, summing block 31C and scaling block 32B. Scaling block 32B scales the value of voltage $V_{SENSE}$, which as noted above, is a measure of the output current of the inverter. Since the output impedance of the inverter is desirably real, that is, the reactive portion of the output impedance should be zero, the inverter is controlled such that the instantaneous value of inverter output current $I_{OUT}$, and therefore voltage $V_{SENSE}$, is proportional to and in-phase with AC power mains voltage $V_{MAINS}$. The above condition is enforced by summing block 31C, which subtracts the scaled value of voltage $V_{SENSE}$ from a value of AC power mains voltage $V_{MAINS}$ that has been dynamically scaled by multiplier block 37. The dynamic scale factor is determined in conformity with the magnitude of link voltage $V_{LINK}$, so that as link voltage $V_{LINK}$ increases, indicating that the MPP of the PV power source has also increased, the output current of the inverter is also increased. Thus, the value of link voltage $V_{LINK}$ serves as an indicator of how much power is available from the PV power source and therefore how much power should be transferred by the inverter to the AC power mains.

The dynamic scale factor applied by multiplier block 37, is determined from the magnitude of link voltage $V_{LINK}$ by a power flow estimator 36 that also receives target link voltage $V_{TARGET}$ to accurately track the dynamic variation in link voltage $V_{LINK}$. The output of power flow estimator 36 is filtered by a filter 35 that has a notch at twice the AC power line frequency and optionally also at the line frequency, so that offset and distortion due to the presence of ripple in link voltage $V_{LINK}$ is prevented. Since the energy stored in link capacitor $C_{LINK}$ is proportional to the square of link voltage $V_{LINK}$, and since the output power of the inverter is proportional to $V_{SENSE}$, due to the output voltage of the inverter being fixed at $V_{MAINS}$, power flow estimator 36 will generally use a square root operation to determine the dynamic scale factor to be applied by multiplier block 37. However, if the variation link voltage $V_{LINK}$ is small, for example, when link capacitor $C_{LINK}$ is large, the scale factor can be computed in direct proportion to link voltage $V_{LINK}$ as an approximation. Also, as described in further detail below, there are several factors that determine how power flow estimator 36 will generate control outputs. Depending on DC-DC converter and inverter operating efficiencies and other necessary conditions of operation, the function used to determine target link voltage $V_{TARGET}$ for a given set of operating conditions may be quite complex, and may be accomplished through look-up tables, piecewise approximations or other suitable techniques.

Figure 6:
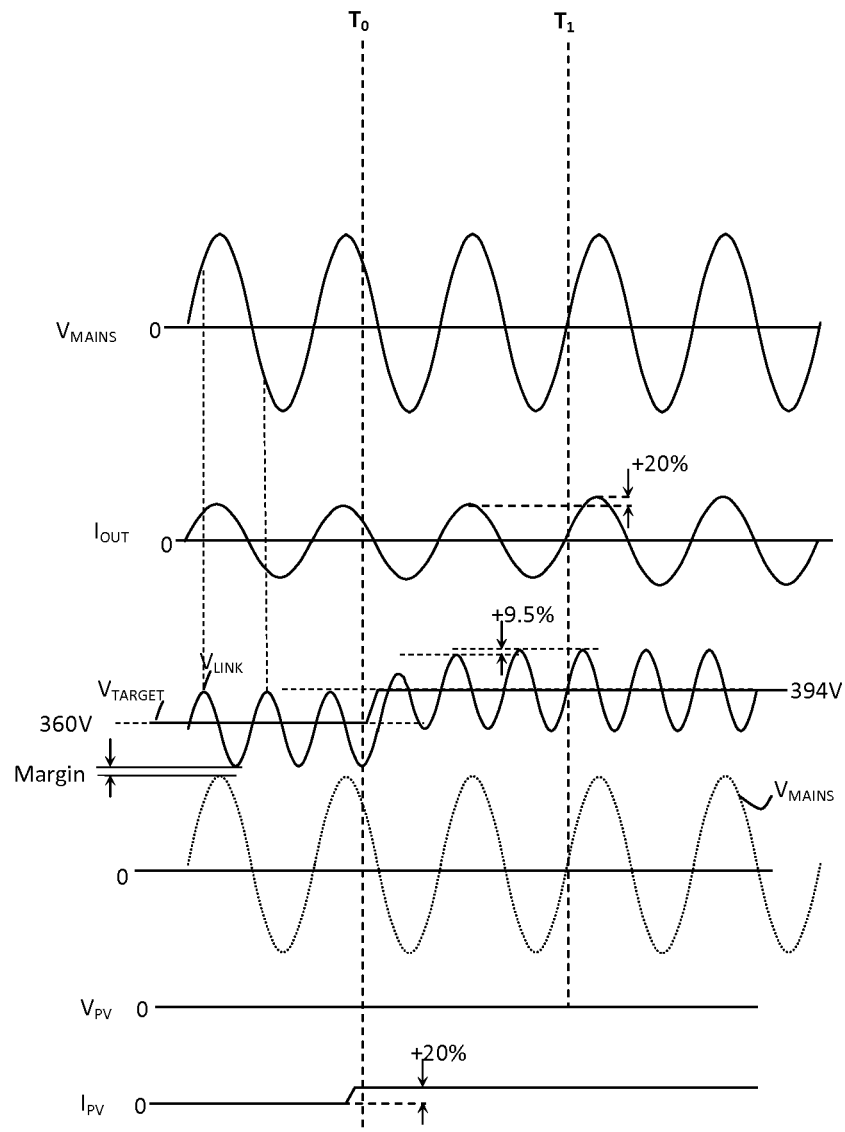
FIG. 6 is a signal diagram depicting power supply waveforms within the systems of FIG. 1 and FIG. 3.

Referring now to FIG. 6, the operation of the PV power system of the present invention is illustrated in a power waveform diagram. The amplitude and phase of AC mains voltage $V_{MAINS}$ is unchanging, while the inverter output current $I_{OUT}$ is illustrated as undergoing a 20% increase at time $T_1$. The increase in output current $I_{OUT}$ results from an increase in the PV power source current $I_{PV}$, occurring at time $T_0$. As MPP estimator 38 reacts to the increased available PV power source current $I_{PV}$, target link voltage $V_{TARGET}$ is increased, which causes the DC-DC converter control loop to increase its conversion ratio and thereby increase the average DC value of link voltage $V_{LINK}$. The inverter control loop reacts to the increase in link voltage $V_{LINK}$, increasing output current $I_{OUT}$. The increase in the DC value of link voltage $V_{LINK}$ is 9.5%, from 360V to 394V, is due to the square root proportion of the energy stored on link capacitor $C_{LINK}$ to the power available from the PV power source. The available power has increased by 20%, due to the 20% increase in the PV power source current $I_{PV}$. The ripple on link voltage $V_{LINK}$ also increases in amplitude by 9.5% as illustrated. The peaks of the ripple occur at the point at which the magnitude of AC mains voltage $V_{MAINS}$ reaches 0.707 times its peak magnitude, i.e., where the instantaneous voltage is equal to the RMS voltage, which is the point in the cycle past which link capacitor $C_{LINK}$ is being discharged to provide energy to the inverter. While the illustration of FIG. 6 provides a simple illustration of operation with a dynamic MPP, in an actual system implementation, the change in link voltage $V_{LINK}$ will generally not be in proportion to the MPP available power, nor its square root, as other criteria will determine the selection of target link voltage $V_{TARGET}$ for a particular MPP condition.

In order to generate the output current, the voltage available to the inverter must exceed the peak voltage $V_{MAINS}$ of the AC mains by a margin Margin sufficient to ensure that output current $I_{OUT}$ can be generated without distortion, i.e., there is sufficient margin available to take into account switching and other losses between the input and the output of the inverter circuit. Also, an upper bound is placed on link voltage $V_{LINK}$ due to the breakdown voltage of the inverter switching transistors N3-N6, as well as the maximum voltage that can be applied to the sensing input of controller IC 20 that is connected to resistor $R_D$. With the above constraints managed by energy controller 30, the criteria for setting target link voltage $V_{TARGET}$ for a given MPP and AC Mains voltage $V_{MAINS}$ is an optimum efficiency operating point for the DC-DC converter and the inverter. The DC-DC converter operating point will generally be controlled to limit the range the conversion ratio will change from its nominal value, and the DC-DC converter can be designed to operate in a narrow range of conversion ratios since the conversion ratio need only change to track the amplitude of the ripple component of link voltage $V_{LINK}$, which can be small relative to the DC value of link voltage $V_{LINK}$.

Figure 7:
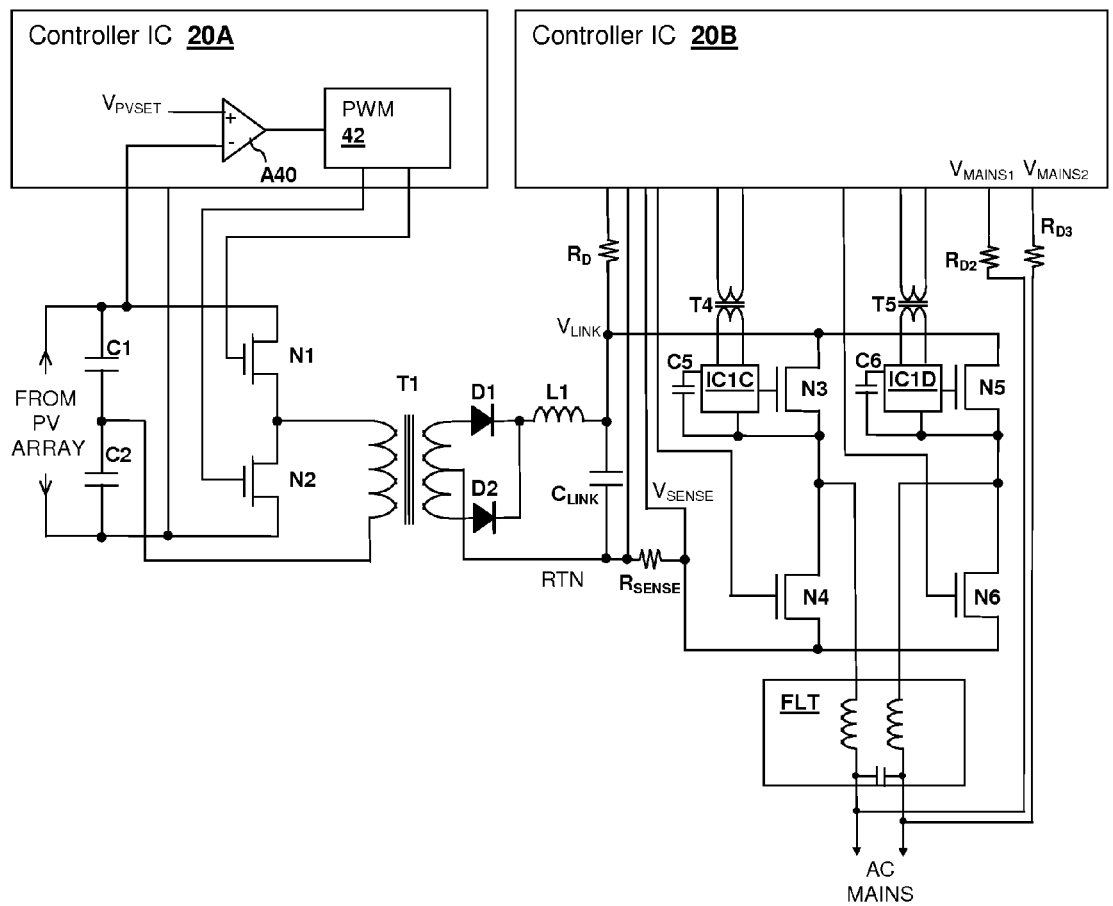
FIG. 7 is a simplified schematic diagram depicting a PV power system in accordance with another embodiment of the present invention.

Referring now to FIG. 7, a simplified schematic of another power converter that can be used to implement power converter 10 of FIG. 1 is shown, in accordance with another embodiment of the invention. The power converter of FIG. 7 is similar to the power converter of FIG. 3, so only differences between them are described below. Rather than using a single controller IC as in the power converter FIG. 3, a pair of controller ICs 20A-20B are provided in the power converter of FIG. 7. Controller IC 20A regulates the output voltage of the PV power source, so that the MPP is maintained without having to sense the current obtained. A specified minimum PV power source voltage $V_{PVSET}$, corresponding to the MPP set point, is compared via error amplifier A40 with the output voltage of the PV power source. A PWM 42 controls the DC-DC converter switching transistors N1 and N2 in accordance with the output of error amplifier A40 as processed by a computation block. Isolated gate drive circuits are not required in the circuit of FIG. 7, but the control is more complex for the DC-DC converter, as computation block 41 must compute the control variable for the PWM 42 (duty cycle and/or switching frequency) to cause link voltage $V_{LINK}$ to be proportional to the power available from the PV power source. Controller IC 20B operates in a manner identical to the inverter control of controller IC 20 of FIG. 3. Since controller IC 20A will ensure that link voltage $V_{LINK}$ indicates the MPP of the PV power source in the same manner as in the power converter of FIG. 3, output current $I_{OUT}$ can be controlled by controller IC 20B in the same manner as described above.

Transformer-Coupled Gate Control

Figure 8:
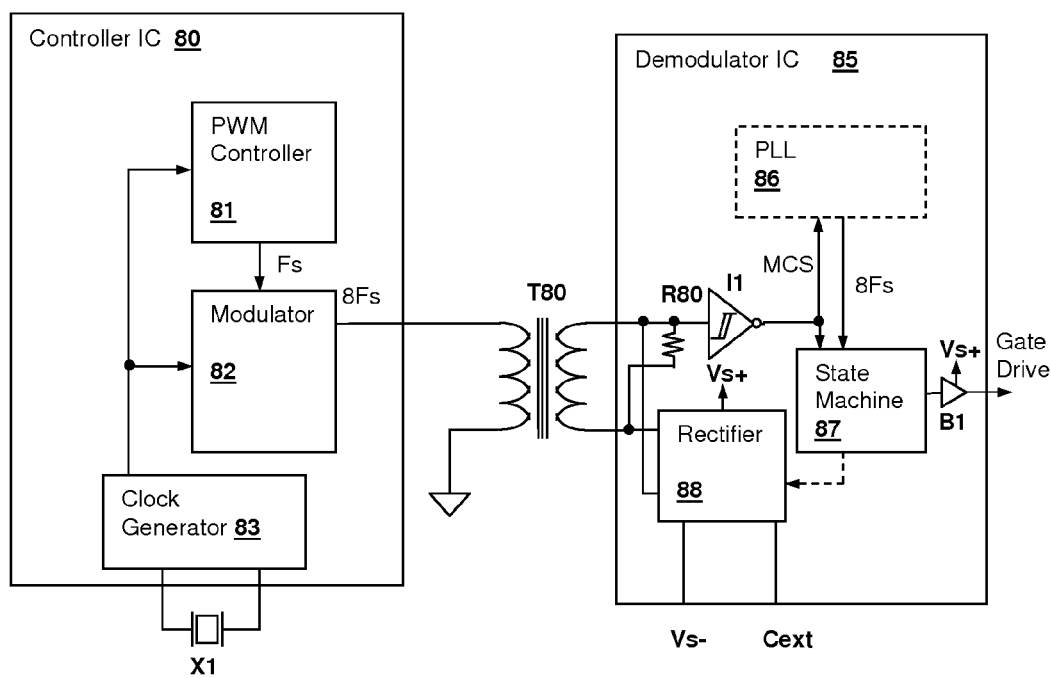
FIG. 8 is a block diagram depicting a gate drive control circuit as may be used to implement gate drive ICs in the systems of FIG. 3 and FIG. 7.

Referring now to FIG. 8, a switching power circuit that may be used to implement the gate control circuits shown in the PV power systems of FIGS. 3 and 7 is illustrated. A crystal X1, is shown connected to controller IC 80, which illustrates a portion of controller IC 20 of FIG. 3 and controller ICs 20A-20B of FIG. 7. Crystal X1 provides a reference for internal clock generator 83, but an internal clock circuit may alternatively be used, reducing component requirements. Further, modulation techniques illustrated below are not state history dependent due to the use of specific code sequences and modulation schemes for which the code values are determined from relative edge (transition) positions, synchronization clock requirements are relaxed over those required for purely frequency modulated (FM) or phase modulated (PM) control signals. Controller IC 80 includes one or more gate control sources, such as a pulse width modulator (PWM) controller 81 operated at a switching frequency Fs. Only one gate control channel is shown, and as illustrated above, multiple gate controls may originate from a single PWM circuit and there may be multiple PWM sources within controller IC 80, such as the DC-DC converter and inverter PWM controllers as illustrated in FIG. 4. A modulator 82 converts the output of PWM controller 81 to a higher rate, illustrated as 8Fs, which is provided to the primary winding of transformer T80.

In practice, the modulating function in controller IC 80 will generally be performed by the same logic that generates the pulse width modulated control information, and extra information can be inserted, for example to control two switching transistors from single gate control IC, or to provide extra control information to control transistor gate compensation circuits, or perform other control operations. Redundant information can also be provided; for example, the simplified illustrated example provides 8 cycles of control signal for each switching period, which may encode 8 or more bits of information used to signal the actual switching times.

Gate control IC 85 includes a rectifier 88, which may be a passive rectifier such as a bridge that supplies power supply voltages Vs+ and Vs−. Alternatively, rectifier 88 may be a switched rectifier that receives a control signal from state machine 87 so that the polarity of the rectification is controlled according to the expected polarity of modulated control signal MCS. Modulated control signal is extracted from the secondary winding of transformer T80 by a circuit including load resistor R80 and Schmitt inverter I1. A phase-locked loop (PLL) 86 may optionally be included to provide a clock reference at 8Fs to state machine 87, but is not required for decoding the modulated control signals of the present invention as will be illustrated in further detail below. Other reference clock generator circuits, such as delay-locked loops (DLLs), may be also alternatively employed. State machine 87 decodes information in modulated control signal MCS to provide a gate drive signal input to buffer B1, which has an output operated from the switching power stage positive power supply rail, which is generally a higher voltage than power supply rail Vs+. The decoding detects the turn-on event code embedded in the modulated control signal, and state machine 87 turns on the gate control signal(s) in response to the turn-on event. As described in detail below, a turn-off code may be used to specify a turn-off event, and state machine 87 turns off the gate control signal(s) in response thereto. A detection error (code not recognized or unassigned) will generally cause a turn-off of all switching transistors, in order to protect the power converter and any connected devices. State machine 87 may also detect a specific blanking code or a blanking condition and ignore subsequent detected codes for a time interval, leaving the gate control signals in their current state. Alternatively, the blanking event may be used to turn off the gate control signal, in which case the gate on event is sent continuously until the blanking event is sent to indicate a turn-off event.

Figure 9A:
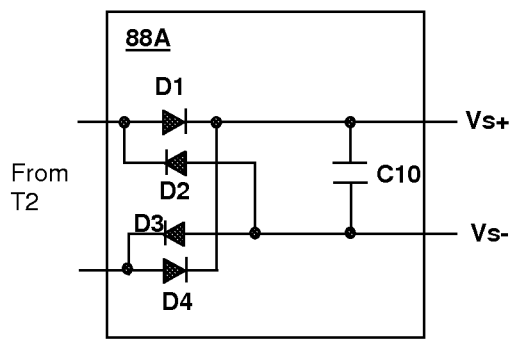
FIGS. 9A-9B are schematic diagrams showing rectifier circuits that may be used to implement rectifier circuit 88 of FIG. 8.

Referring now to FIG. 9A, a rectifier circuit 88A that may be used to implement rectifier circuit 88 of FIG. 8 is shown. Diodes D1-D4 form a full-wave bridge and capacitor C10 filters the rectified modulated control signal to provide DC power supply outputs Vs+ and Vs−. Capacitor C10 may be provided external to the integrated circuit package that includes the demodulator and rectifier circuits, such as connected between power supply output Vs− and terminal Cext in the circuit of FIG. 8 and as illustrated in FIG. 3 and FIG. 7.

Figure 9B:
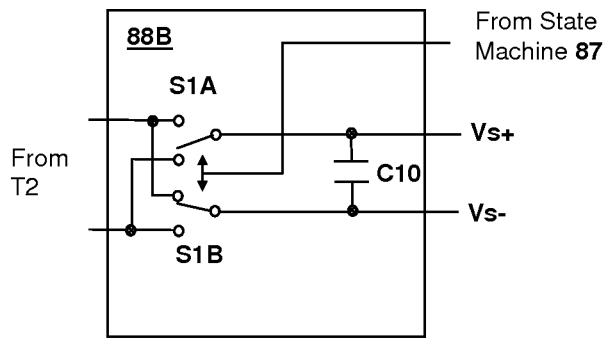

Referring now to FIG. 9B, a rectifier circuit 88B that may be used to implement rectifier circuit 88 of FIG. 8 is shown. Switches S1A and S1B are controlled by a signal provided from state machine 87 to control the rectification polarity according to the expected (or actual detected) polarity of modulated control signal MCS. Capacitor C10 filters the output of switches S1A and S1B to provide DC power supply outputs Vs+ and Vs−.

Figure 10A:
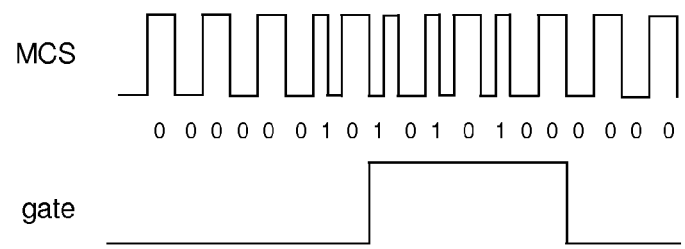
FIGS. 10A-10D are signal waveform diagrams depicting signals within the circuit depicted in FIG. 8 having differing modulation schemes in accordance with embodiments of the present invention.
Figure 10B:
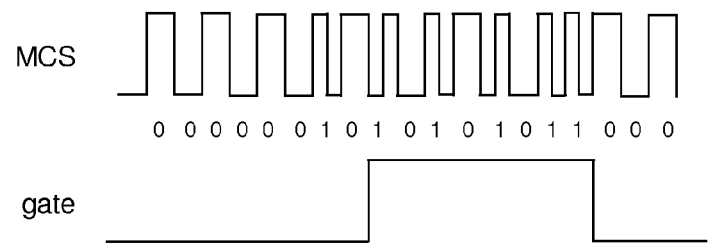

Referring now to FIGS. 10A-10B, signal waveform diagrams are shown that illustrate operation of the above-described modulated control scheme. FIG. 10A illustrates a modulation scheme that uses a transition within a half-period of the basic (longer) period of modulation control signal MCS to signal a binary "1" value and the absence of such a transition to signal a binary "0" value. Thus, the relative timing of the edge transitions in the modulation control signal MCS encode a binary stream. While the specific embodiment illustrated in FIG. 10A uses binary encoding, ternary or higher-order encodings may be employed in other embodiments of the present invention. Further, as will be illustrated below, a blanking state may be included to save power by turning the modulated control signal "off", and information can also be obtained from the off state. FIG. 10A also illustrates a particular coding scheme for the binary stream, which is used to signal turn-on and turn-off events that signals the demodulator and associated control circuits to turn a power switching transistor on and off. A "turn-off event" code of all zeros is assigned to set gate control signal gate to a state, illustrated as a low voltage level, which will turn the corresponding power switching transistor off. A "turn-on event" code of alternating ones and zeros is assigned to set gate control signal gate to a higher voltage value, turning the corresponding power switching transistor on. The code for turn-on can be quite long, increasing the robustness of the circuit, which is highly desirable, as the turn-on of a power switching transistor at an improper time can lead to catastrophic failure of the switching converter and connected devices. As illustrated in FIG. 10A, two consecutive zero values are detected before the decision is made (e.g., by state machine 87 in FIG. 8 above) to change the state of gate control signal gate. FIG. 10B illustrates the same modulation and encoding scheme, in which the transition to a "turn-off" state occurs when the binary stream is in the "1" state, requiring detection of two consecutive one values to enable the decision to turn the transistor off. Detection of any other pattern that is unassigned (e.g., an unassigned code) will also cause the demodulator to turn the transistor off. As can be observed from modulation control signal MCS, since the relative timing between the edges is at a 2:1 ratio, minor variations in the frequency will not disrupt operation, and can be used advantageously (e.g., by PWM controller 81 of FIG. 8) to position the transitions of gate control signal gate. Further, as mentioned above, a PLL or other reference clock generator is not required to decode modulation control signal MCS, as the timing detection can be performed by a timing reference having a stability and accuracy sufficient to distinguish the 2:1 period ratio with some confidence, such as a capacitor-based ramp circuit.

Figure 10C:
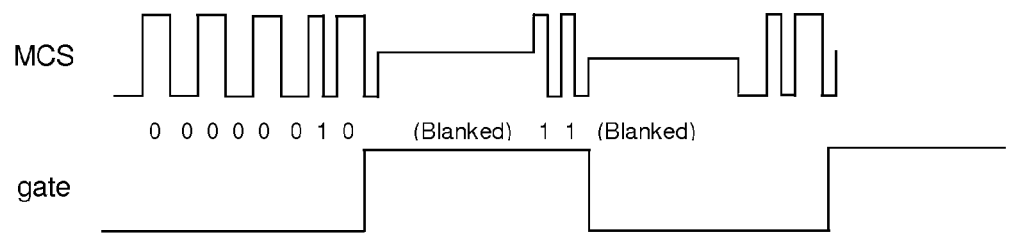

FIG. 10C illustrates another modulation scheme employing blanking to avoid mis-triggering due to noise generated by the power switching action of the circuits described above. An alternating pattern, as illustrated in FIG. 10A and FIG. 10B, is again used to signal the on state of gate control signal gate, but after the first alternation event, the signal is blanked. As mentioned above, the blanking can be performed by the modulator circuit, which can short the windings of the transformer, or blanking can be determined by a time interval or count of periods during which the demodulator ignores the transitions of modulation control signal MCS. Alternatively, a "blanking event" code can be used to indicate the beginning of a blanking interval. Blanking further reduces the power consumption of the modulator and/or the demodulator by reducing the transitions that are generated and detected.

Figure 10D:
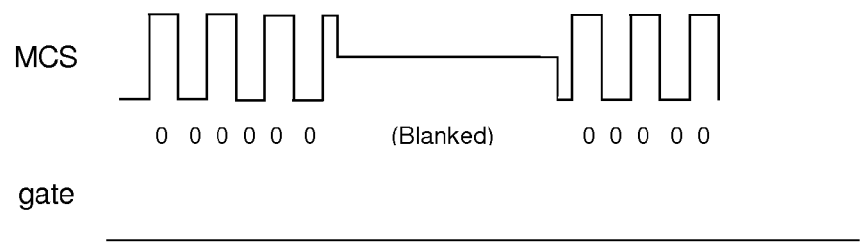

FIG. 10D illustrates a blanking event not associated with a turn-on or turn-off event in another modulation scheme. The negative half-pulse occurring at the end of the blanking event cancels the transformer magnetization due to the positive half-pulse, so that such a blanking event can be inserted at any time in the modulated control signal when no other events are to be inserted to reduce power consumption. The primary (controller side) of the transformer is shorted during the blanking interval or otherwise held at a zero potential. The blanking event can also be detected by the demodulator and used to ignore the modulated control signal, further improving noise immunity.

Figure 11:
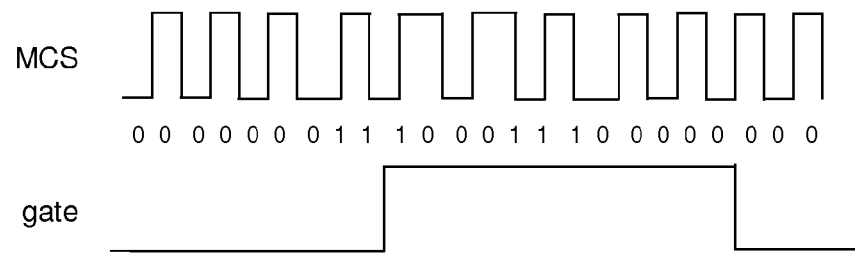
FIG. 11 is a signal waveform diagram depicting signals within the circuits depicted in FIG. 8 having a modified-FM (MFM) modulation scheme in accordance with another embodiment of the present invention.

FIG. 11 illustrates still another modulation and encoding scheme. In FIG. 11, modulation control signal MCS is a modified-FM (MFM) signal, that reduces the overall number of transitions required to transmit the turn-on event and turn-off event codes. In the depicted modulation control scheme, a sequence of 111000111000 . . . indicates the turn-on event and a sequence of 00000 is treated as a turn-off event. A reference clock is generally needed to decode MFM, unlike the scheme illustrated above, because the positions of the edge transitions of modulation control signal MCS determine whether a "1" bit is present. When a shift of a quarter period occurs as illustrated in modulation control signal MCS of FIG. 11, the edge transitions are now centered in the half-periods defined by the previous waveform defining the 00000 . . . bitstream and the value of "1" is transmitted. When the edge position shifts back, the value binary value returns to zero.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A power converter for providing an AC power output from a photovoltaic power source, the power converter comprising:
a capacitive storage element;
an inverter circuit having an input coupled to the capacitive storage element and an output providing the AC power output at a line frequency, wherein the inverter circuit draws charge from the capacitive storage element cyclically at half-periods of the line frequency and thereby causes a ripple variation in a voltage across the capacitive storage element; and a DC-DC converter having an input coupled to an output of the photovoltaic power source, and an output coupled across the capacitive storage element, wherein a conversion ratio of the DC-DC converter is varied by controlling a switching circuit of the DC-DC converter such that the output of the photovoltaic power source is maintained at a substantially constant voltage, and wherein the conversion ratio of the DC-DC converter varies at the half-periods of the line frequency as the output of the DC-DC converter follows the ripple variation in the voltage across the capacitive storage element.

2. The power converter of claim 1, wherein the conversion ratio of the DC-DC converter is further controlled such that an average voltage across the capacitive storage element is controlled in conformity with a maximum power point of the photovoltaic power source, wherein as an available output power from the photovoltaic power source increases, an average level of the voltage across the capacitive storage element is increased.

3. The power converter of claim 2, further comprising a control circuit for perturbing the conversion ratio of the DC-DC converter at the start of a measurement interval to vary a voltage of the input of the DC-DC converter, and determining the maximum power point of the photovoltaic power source from a resulting change in an indication of an output current of the inverter.

4. The power converter of claim 3, wherein the indication of the output current of the inverter is a voltage across the capacitive storage element.

5. The power converter of claim 2, further comprising a control circuit for perturbing the voltage across the capacitive storage element at the start of a measurement interval, and measuring a resulting change in the conversion ratio of the DC-DC converter to determine the maximum power point of the photovoltaic power source.

6. The power converter of claim 1, wherein the conversion ratio of the DC-DC converter is controlled solely in conformity with a measured variation of the voltage across the capacitive storage element.

7. The power converter circuit of claim 1, wherein the control circuit controls a duty cycle of the switching circuit in conformity with the output of the comparison circuit.

8. The power converter circuit of claim 1, wherein the control circuit controls a switching frequency of the switching circuit in conformity with the output of the comparison circuit.

9. The power converter of claim 1, wherein the inverter adjusts a current of the AC power output to regulate an average energy stored in the capacitive storage element.

10. The power converter of claim 9, wherein a magnitude of the current of the AC power output is controlled solely in conformity with a measured voltage across the capacitive storage element.

11. The power converter of claim 1, wherein the DC-DC converter further comprises:
a reference voltage circuit for generating a reference voltage;
a comparison circuit having inputs coupled to the reference voltage circuit and the input of the DC-DC converter for comparing a voltage of the DC operating point of the photovoltaic power source to the reference voltage; and
a control circuit for controlling switching of the switching circuit of the DC-DC converter in conformity with an output of the comparison circuit, wherein the control circuit maintains the voltage of the DC operating point of the photovoltaic power source at a substantially constant voltage.

12. The power converter of claim 1, wherein the DC-DC converter further comprises a control circuit for controlling switching of the switching circuit of the DC-DC converter in conformity with the ripple variation in the voltage across the capacitive storage element.

13. An integrated circuit for controlling a power converter for providing an AC power output from a photovoltaic power source, the integrated circuit comprising:
a sensing circuit for sensing a voltage across a capacitive storage element used to transfer energy from an output of the photovoltaic power source to the AC power output; and
a control circuit for generating switching signals for controlling a DC-DC converter having an input coupled to the output of the photovoltaic power source, and an output coupled across the capacitive storage element, wherein the switching signals are controlled in conformity with an output of the sensing circuit.

14. The integrated circuit of claim 13, wherein the control circuit varies a conversion ratio of the DC-DC converter such that the output of the photovoltaic power source is maintained at a substantially constant DC operating point across the half-periods of the line frequency, whereby any ripple voltage across the capacitive storage element caused by a load is not reflected in the input impedance of the DC-DC converter.

15. The integrated circuit of claim 13, wherein the control circuit further comprises a circuit for controlling switching of an inverter circuit having an input coupled to the capacitive storage element and an output providing the AC power output.

16. A method of providing an AC power output from a photovoltaic power source, the method comprising:
generating an AC power output at a line frequency from a capacitive storage element using an inverter, wherein the inverter draws charge from the capacitive storage element cyclically at half-periods of the line frequency and thereby causes a ripple variation in a voltage across the capacitive storage element;
charging the capacitive storage element with an output of a DC-DC converter that draws power from the photovoltaic power source; and
varying a conversion ratio of the DC-DC converter by controlling a switching circuit of the DC-DC converter such that the output of the photovoltaic power source is maintained at a substantially constant voltage, and wherein the conversion ratio of the DC-DC converter varies at the half-periods of the line frequency as the output of the DC-DC converter follows the ripple variation in the voltage across the capacitive storage element.

17. The method of claim 16, wherein the varying further controls the conversion ratio of the DC-DC converter such that an average voltage across the capacitive storage element is set in conformity with a maximum power point of the photovoltaic power source, wherein as an available output power from the photovoltaic power source increases, an average level of the voltage across the capacitive storage element is increased.

18. The method of claim 17, further comprising:
perturbing the conversion ratio of the DC-DC converter to vary a voltage of the input of the DC-DC converter; and
determining the maximum power point of the photovoltaic power source from a resulting change in an indication of an output current of the inverter.

19. The method of claim 18, wherein the indication of the output current of the inverter is a voltage across the capacitive storage element.

20. The method of claim 17, further comprising:
perturbing the voltage across the capacitive storage element; and
measuring a resulting change in the conversion ratio of the DC-DC converter to determine the maximum power point of the photovoltaic power source.

21. The method of claim 16, wherein the varying is performed solely in conformity with a measured variation of the voltage across the capacitive storage element.

22. The method of claim 16, further comprising adjusting a current of the AC power output to regulate an average energy stored in the capacitive storage element.

23. The method of claim 22, further comprising measuring a voltage across the capacitive storage element, and wherein the adjusting is performed solely in conformity with a result of the measuring.

24. A method of providing an AC power output from a photovoltaic power source, the method comprising:
generating an AC power output at a line frequency from a capacitive storage element using an inverter;
charging the capacitive storage element with an output of a DC-DC converter that draws power from the photovoltaic power source;
measuring a voltage across the capacitive storage element; and
controlling an output current of the inverter in conformity with a result of the measuring.

25. The method of claim 24, further comprising controlling a conversion ratio of the DC-DC converter in conformity with the result of the measuring.

26. A power converter for providing an AC power output from a photovoltaic power source, the power converter comprising:
a capacitive storage element;
an inverter circuit having an input coupled to the capacitive storage element and an output providing the AC power output at a line frequency; and
a DC-DC converter having an input coupled to an output of the photovoltaic power source, and an output coupled across the capacitive storage element, wherein a conversion ratio of the DC-DC converter is varied by controlling a switching circuit of the DC-DC converter such that the output of the DC-DC converter has a high impedance permitting voltage variation due to an input current of the inverter, and such that the input of the DC-DC converter has a low impedance so that the output of the photovoltaic power source is maintained at a substantially constant DC voltage.

27. The power converter of claim 26, wherein the inverter adjusts a current of the AC power output to regulate an average energy stored in the capacitive storage element.

28. A method of providing an AC power output from a photovoltaic power source, the method comprising:
generating an AC power output at a line frequency from a capacitive storage element using an inverter, wherein the inverter draws charge from the capacitive storage element cyclically at half-periods of the line frequency and thereby causes a ripple variation in a voltage across the capacitive storage element;
charging the capacitive storage element with an output of a DC-DC converter that draws power from the photovoltaic power source; and
varying a conversion ratio of the DC-DC converter by controlling a switching circuit of the DC-DC converter such that the output of the DC-DC converter has a high impedance permitting voltage variation due to an input current of the inverter, and such that the input of the DC-DC converter has a low impedance so that the output of the photovoltaic power source is maintained at a substantially constant DC voltage.

29. The method of claim 28, further comprising adjusting a current of the AC power output to regulate an average energy stored in the capacitive storage element.

* * * * *